(12) United States Patent
Jiang et al.

(10) Patent No.: US 9,411,438 B1
(45) Date of Patent: *Aug. 9, 2016

(54) UTILIZATION OF MULTIPLE KEYPADS FOR PASSWORD INPUTS

(71) Applicant: International Business Machines Corporation, Armonk, NY (US)

(72) Inventors: Tao Jiang, Shanghai (CN); Ping Li, Shanghai (CN); Xian D. Meng, Shanghai (CN); George J. Romano, Rochester, MN (US); Jianhua Rui, Shanghai (CN); Zhao L. Wang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/976,016

(22) Filed: Dec. 21, 2015

Related U.S. Application Data

(63) Continuation of application No. 14/731,486, filed on Jun. 5, 2015.

(51) Int. Cl.
G06F 21/31 (2013.01)
G06F 3/0346 (2013.01)
G06F 21/36 (2013.01)

(52) U.S. Cl.
CPC ............ *G06F 3/0346* (2013.01); *G06F 21/36* (2013.01)

(58) Field of Classification Search
CPC ... G06F 3/0346; G06F 3/04883; G06F 21/36; G06F 7/04; G06F 3/0233; G06F 3/04886; G06F 21/31; G06F 21/606; G06F 21/83; H04L 29/06; H04L 63/08; H04W 12/06
See application file for complete search history.

(56) References Cited

U.S. PATENT DOCUMENTS

| 7,484,173 | B2 | 1/2009 | Gao et al. |
| 7,698,563 | B2 | 4/2010 | Shin |
| 9,165,132 | B2 | 10/2015 | Rhee et al. |

(Continued)

FOREIGN PATENT DOCUMENTS

WO      2010053594 A1      5/2010

OTHER PUBLICATIONS

De Luca et al.; "ColorPIN—Securing PIN Entry through Indirect Input"; CHI 2010; Apr. 10-15, 2010; Atlanta, Georgia, USA; Copyright © 2010, ACM; 4 pages.

(Continued)

*Primary Examiner* — Amir Mehrmanesh
(74) *Attorney, Agent, or Firm* — William H. Hartwell

(57) ABSTRACT

A method includes generating a first virtual keypad for entry of a first portion of a password, wherein the first portion includes a first value and a second value. The method receives the first portion, wherein the first portion includes a first number of keys selected equal to the first value and the second value present in the first number of keys selected. The method generates a second virtual keypad for entry of a second portion, wherein the second portion includes a third and a fourth value. The method receives the second portion, wherein the second portion includes a second number of keys selected equal to the third value and the fourth value present in the second number of keys selected. Responsive to determining the first and the second portion matches an account password, the method determines to grant a user access to an account associated with the account password.

1 Claim, 5 Drawing Sheets

(56) References Cited

U.S. PATENT DOCUMENTS

| | | | | |
|---|---|---|---|---|
| 9,262,615 | B2* | 2/2016 | Beloncik | G06F 21/32 |
| 2003/0210127 | A1* | 11/2003 | Anderson | G06F 21/36 |
| | | | | 340/5.27 |
| 2004/0243854 | A1 | 12/2004 | Lee | |
| 2008/0172735 | A1* | 7/2008 | Gao | G06F 3/04886 |
| | | | | 726/19 |
| 2009/0106827 | A1* | 4/2009 | Cerruti | G06F 21/31 |
| | | | | 726/7 |
| 2011/0288965 | A1* | 11/2011 | Lazarro | G06Q 30/0641 |
| | | | | 705/27.1 |
| 2012/0268393 | A1* | 10/2012 | Lee | G06F 21/36 |
| | | | | 345/173 |
| 2013/0047238 | A1* | 2/2013 | Hwang | H04L 9/3228 |
| | | | | 726/7 |
| 2013/0091583 | A1* | 4/2013 | Karroumi | G06F 3/0236 |
| | | | | 726/26 |
| 2013/0139248 | A1* | 5/2013 | Rhee | G06F 3/0346 |
| | | | | 726/19 |
| 2013/0189952 | A1 | 7/2013 | Kim | |
| 2014/0055235 | A1 | 2/2014 | Choi | |
| 2014/0096201 | A1 | 4/2014 | Gupta et al. | |
| 2014/0215632 | A1 | 7/2014 | Adderly et al. | |
| 2014/0223550 | A1 | 8/2014 | Nagar | |

OTHER PUBLICATIONS

"Concept for Matrix-based Passwords that are safe against observation"; An IP.corn Prior Art Database Technical Disclosure; IP.com No. 000206725; IP.com Electronic Publication: May 4, 2011; pp. 1-5.

"Method to improve pattern based password entry"; An IP.corn Prior Art Database Technicai Disclosure; IP.com No. 000228888; IP.com Electronic Publication: Jul. 10, 2013; pp. 1-2.

Appendix P List of IBM Patents or Applications Treated as Related. Dated Apr. 7, 2016. Two pages.

U.S. Appl. No. 14/731,486, filed Jun. 5, 2015, Entitled "Utilization of Multiple Keypads for Password Inputs".

* cited by examiner

UTILIZATION OF MULTIPLE KEYPADS FOR PASSWORD INPUTS

BACKGROUND

The present invention relates generally to password inputs and more particularly to the utilization of virtual keypads for portion based password inputs.

Mobile devices currently allow for users to utilize numerous applications and perform functions such as online banking and online commerce. Online banking and online commerce along with other mobile device functions typically involve the use of security features to protect the private information associated with a user. Security features can include unlocking a mobile device prior to accessing content on the mobile device or entry of a numerical password or personal identification number (PIN) to protect the user's account information, such as credit card and bank account information. Mobile devices with touch screens or automated teller machine (ATM) allow for the user to access personal information in public areas, where the user takes precautions to ensure password inputs are not viewable to the public. A person looking in the direction of the user inputting the password has the ability to see each digit of a numerical password or PIN being entered.

SUMMARY

Embodiments of the present invention includes a method, computer program product and computer system for password inputs utilizing multiple keypads. A computer-implemented method includes: generating a first virtual keypad for entry of a first portion of a password, wherein the first portion includes a first value and a second value; receiving the first portion of the password, wherein the first portion includes a first set of keys including a first number of keys entered by a user using the first virtual keypad, wherein the first number of keys included in the first set of keys is equal to the first value and the second value is present in the first set of keys; generating a second virtual keypad for entry of a second portion of the password, wherein the second portion includes a third value and a fourth value; receiving the second portion of the password, wherein the second portion includes a second set of keys including a second number of keys entered by the user using the second virtual keypad, wherein the second number of keys included in the second set of keys is equal to the third value and the fourth value is present in the second set of keys; and responsive to determining the first portion and the second portion of the password match an account password, determining to grant the user access to an account associated with the account password.

DETAILED DESCRIPTION

Figure 1:
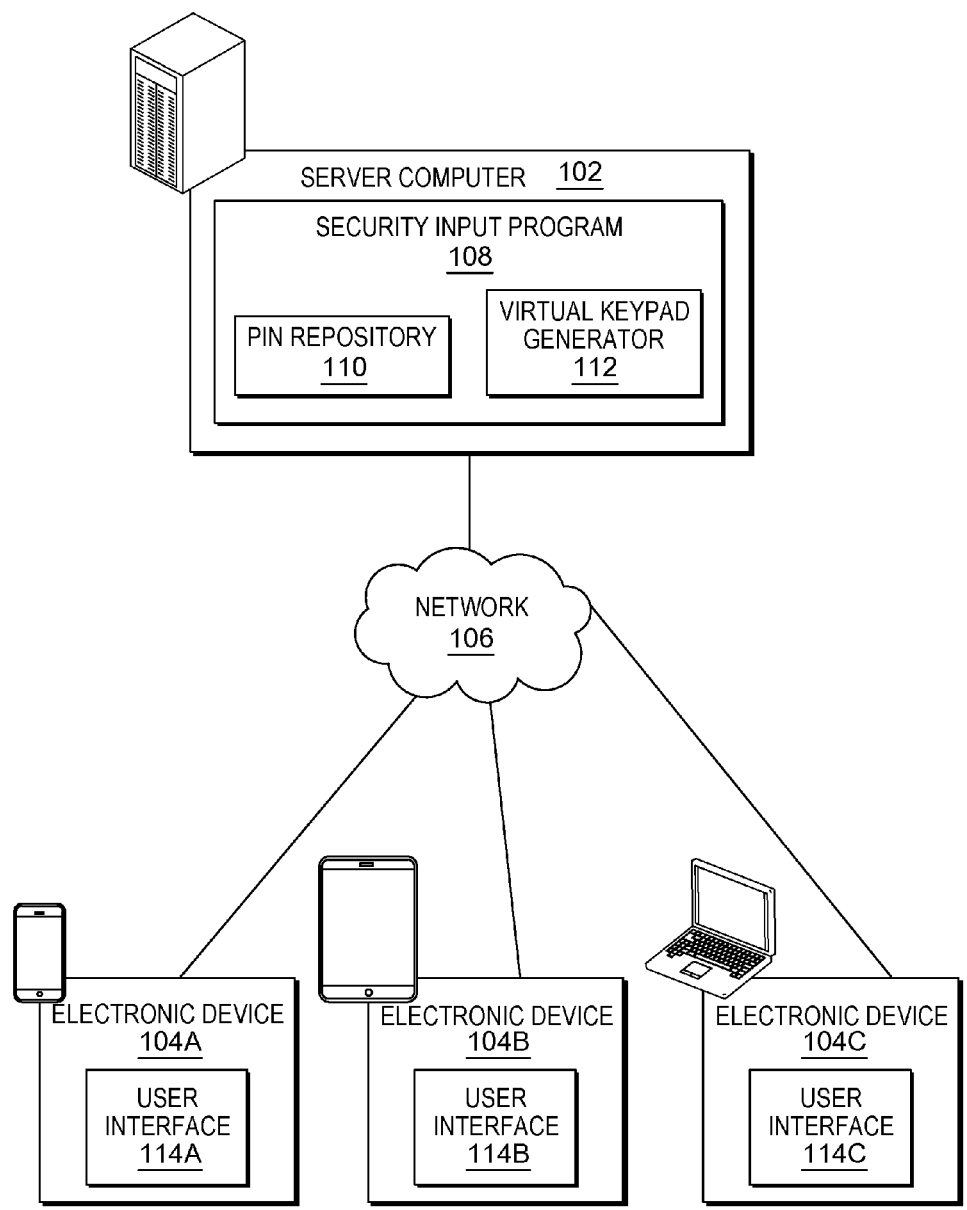
FIG. 1 is a functional block diagram illustrating a distributed data processing environment, in an embodiment in accordance with the present invention.

Example embodiments in accordance with the present invention will now be described in detail with reference to the drawing figures. FIG. 1A is a functional block diagram illustrating a data processing environment. The distributed data processing environment includes server computer 102, electronic device 104A, 104B, and 104C connected over network 106.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 106, as is common in data centers and with cloud computing applications. In general, server computer 102 is representative of any programmable electronic device or combination of programmable electronic devices capable of executing machine readable program instructions and communicating with other computer devices via a network.

Security input program 108 located on server computer 102 has the ability to establish a password and verify the password entry, where the password remains constant but an input method for entering portions of the password varies. In an embodiment, security input program 108 has the ability to determine a password verification is required to access an account and sends a request for password verification to the user trying to access the account. Security input program 108 can generate a first virtual keypad, where the orientation of the digits on the first virtual keypad are random. Security input program 108 can receive an input for a first portion of the password on the first virtual keypad, where the user drags a finger across a number of digits on the keypad equivalent to an odd digit of the password and the digits touched with the finger drag include an even digit of the password. Subsequently, security input program 108 generates a second virtual keypad and receives a second portion of the password, where the second portion includes another odd and even pair of the password. Security input program 108 generates virtual keypads and receives 2 digits of the password (i.e., an odd position value and an even position value) until all digits for the password are received.

Electronic device 104A, 104B, and 104C may be a desktop computer, a laptop computer, a tablet computer, a specialized computer server, a smart phone, or any programmable electronic device capable of communicating with server computer 102 via network 106. In general, electronic device 104A, 104B, and 104C represents any programmable electronic device or combination of programmable electronic devices capable of executing machine readable program instructions and communicating with other computing devices via a network, such as network 106. Each of electronic device 104A, 104B, and 104C is a computer device capable of displaying and receiving input on a virtual keyboard from a user. In this embodiment, electronic device 104A is a mobile device, electronic device 104B is a tablet computer, and electronic device 104C is a laptop computer.

User interface 114A, 114B, and 114C provides an interface for the users of electronic devices 104A, 104B, and 104C, respectively, to communicate with security input program 108. User interface 114A, 114B, and 114C each may be a graphical user interface (GUI) or a web user interface (WUI) and can display text, documents, web browser windows, user options, application interfaces, and instructions for operation, and includes the information (such as graphic, text, and sound) a program presents to a user and the control sequences the user employs to control the program. In this embodiment, user interface 114A displays a keypad on a mobile device (i.e., electronic device 104A), user interface 114B displays a keypad on a tablet computer (i.e., electronic device 104B), and user interface 114C displays a keypad on an automated teller machine (i.e., electronic device 104C).

In general, network 106 can be any combination of connections and protocols that will support communications among server computer 102, electronic device 104A, 104B, and 1104C. Network 106 can include, for example, a local area network (LAN), a wide area network (WAN), such as the internet, a cellular network, or any combination of the preceding, and can further include wired, wireless, and/or fiber optic connections. In one embodiment, security input program 108 can be a web service accessible via network 106 to the users of electronic device 104A, 104B, and 104C. In another embodiment, security input program 108 may be operated directly by a user of server computer 102.

Figure 2:
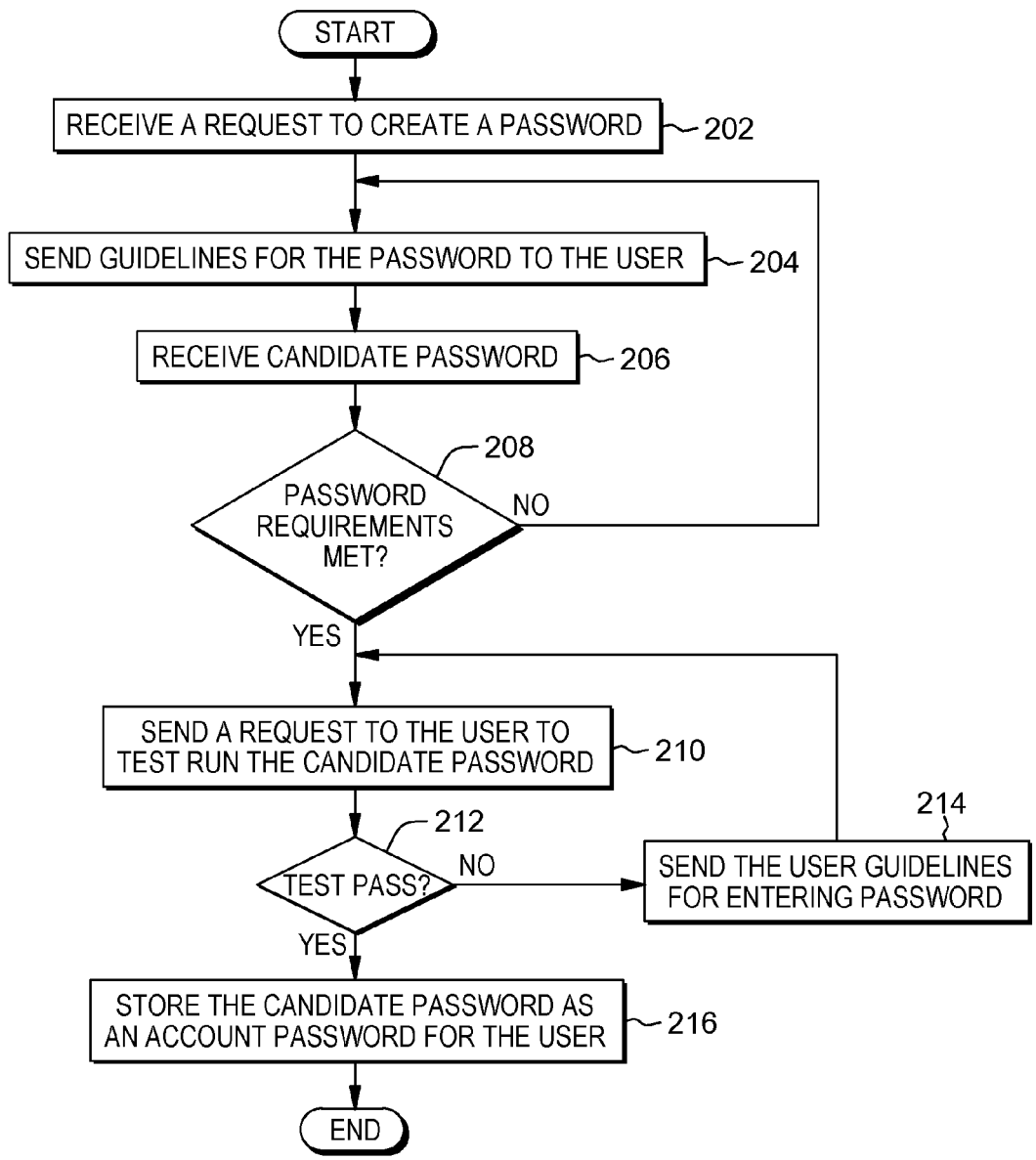
FIG. 2 is a flowchart depicting one embodiment of a security input program for receiving and testing a candidate password, in accordance with the present invention.

FIG. 2 is a flowchart depicting one embodiment of a security input program for receiving and testing a candidate password, in accordance with the present invention. As depicted, the method includes receiving (202) a request to create a password, sending (204) guidelines for the password to the user, receiving (206) a candidate password, determining (208) whether the candidate password meets the guidelines, sending (210) a request to the user to test run the candidate password, determining (212) whether the candidate password passes the test, sending (214) the user guidelines for entering the password, and storing (216) the candidate password as an account password for the user. In one embodiment, the method is conducted by security input program 108.

The method may commence by receiving (202) a request to create a password. In this embodiment, security input program 108 receives a request from a user to create a password for an account associated with the user. The creation of the password can include creating a new password for a new account or updating an existing account by replacing a previously stored password with a new password. Security input program 108 has the ability to determine a type of electronic device from which the request for the creation of the password originated through metadata signatures associated with the request. If the metadata signature associated with the request to create the password does not match a previously received metadata signature for the account, signature input program 108 can flag the request to create the password for the account. Signature input program 108 can notify the user associated with the account that a request to create a password was received but the device from which the request was sent was not recognized.

The method may continue by sending (204) guidelines for the password to the user. Guidelines for the password include password requirements and input method requirements. In this embodiment, password requirements include an eight value password, where the eight value password comprises of four pairs of an odd position value and an even position value. The odd position value for each of the four pairs cannot include a digit of 0 or 1. Input method requirements include sliding over a number of digits on a keypad equivalent to the value in the odd position value for each of the four pairs. The digits on the keypad being slid over by the user include the even position value. For example, an eight digit password of "79548132" includes digits "7, 5, 8, 3" in the odd position values and "9, 4, 1, 2" in the even position values. The first pair includes "79", the second pair includes "54", the third pair includes "81", and the four includes "32". As a result, for the first pair, the user has to slide across "7" digits on the keypad, where one of the "7" digits includes the even position value "9". For the second pair, the user has to slide across "5" digits, where one of the "5" digits includes the even position value "4". For the third pair, the user has to slide across "8" digits, where one of the "8" digits includes the even position value "1". For the final pair, the user has to slide across "3" digits, where one of the "3" digits includes the even position value "2".

In other embodiments, password requirements can include character types, character length, and character rules. Examples of character types can include numerical values, alphabetical letters, language logograms, and images. Examples of character rules can include no repetition of characters, no consecutive numerical values, and odd position value are required to be a numerical value. Input method requirements can include a specification as to whether the odd position value or the even position value needs to be entered with a sliding motion across the keypad.

The method may continue by receiving (206) a candidate password. In this embodiment, security input program 106 receives the candidate password (that is, the actual candidate password, not the candidate password as it would be entered by a user to meet the input method requirements). For example, if the password is "79548132", security input program 106 receives the password as a simple one step entry into a keypad. The user can press the key for each digit in the 8 value password.

The method may continue by determining (208) whether the candidate password meets the password requirements. In the event security input program 108 determines the candidate password meets the password requirements ("yes" branch, 208), the method may continue by sending (210) a request to the user to test run the candidate password. In the event security input program determines the candidate password does not meet password requirements ("no" branch, 208), security input program 108 can re-send the password requirements for the password to the user. Security input program 108 can highlight the one or more password requirements not met by the candidate password when re-sending the guidelines of the password to the user.

The method may continue by sending (210) a request to the user to test run the candidate password. In this embodiment, security input program 108 sends a request to enter the candidate password utilizing a keypad on a client device associated with the user. The request to enter the candidate password represents a test-run to ensure the user is aware of the input method for entering the candidate password. The test-run can mimic an actual request for password verification.

In another embodiment, security input program 108 sends a request to enter the candidate password utilizing a keypad on a client device associated with the user, where the request includes a step-by-step visual guide on entering the candidate password. In one example, a candidate password that meets the proper guidelines includes the 8 digits, "79548132". Security input program 108 generates a first virtual keypad for entry of the first set of 2 digits (i.e., "79") of the candidate password, where the first virtual keypad displays an example of how the user can enter the first set of 2 digits of the candidate password. The user repeats the example on the first virtual keypad for entering the first set of 2 digits of the candidate password. Subsequently, security input program 108 generates a second virtual keypad for entry of the second set of 2 digits (i.e., "54") of the candidate password, where the second virtual keypad displays an example of how the user can enter second set of 2 digits of the candidate password. Security input program 108 repeats the generation of new virtual keypad for every subsequent set of 2 digits of the candidate password until the candidate password is completely entered during the test run for entry of the candidate password.

The method may continue by determining (212) whether the candidate password passes the test. In the event security input program 108 determines the candidate password does not pass the test for candidate password input method ("no" branch, 214), the method may continue by sending (214) the user guidelines for entering the password. In the event security input program 108 determines the candidate password passes the test for candidate password input method ("yes" branch, 212), the method may continue by storing (216) the candidate password for the user.

The method may continue by sending (214) the user guidelines for entering the password. In this embodiment, security input program 108 sends the guidelines outlining the input method for entering the candidate password. Security input program 108 has the ability to highlight a portion of the guidelines which are not being met when entering the password. In another embodiment, security input program 108 sends the guidelines outlining the input method along with a video tutorial of how to input the candidate password. The video tutorial is of an example candidate password being entered by a user, while meeting the input method requirements for the password. Subsequently, security input program 108 can re-send the request to the user to test run the candidate password.

The method may continue by storing (216) the candidate password as an account password for the user. In this embodiment, security input program 108 associates the candidate password with a new account being created by the user and stores the candidate password as an account password for the new account. In another embodiment, where the candidate password is replacing a previously stored password for an existing account, security input program 108 associates the candidate password with the existing account. Security input program 108 can delete the previously stored password and store the candidate password as an account password for the existing account.

Figure 3:
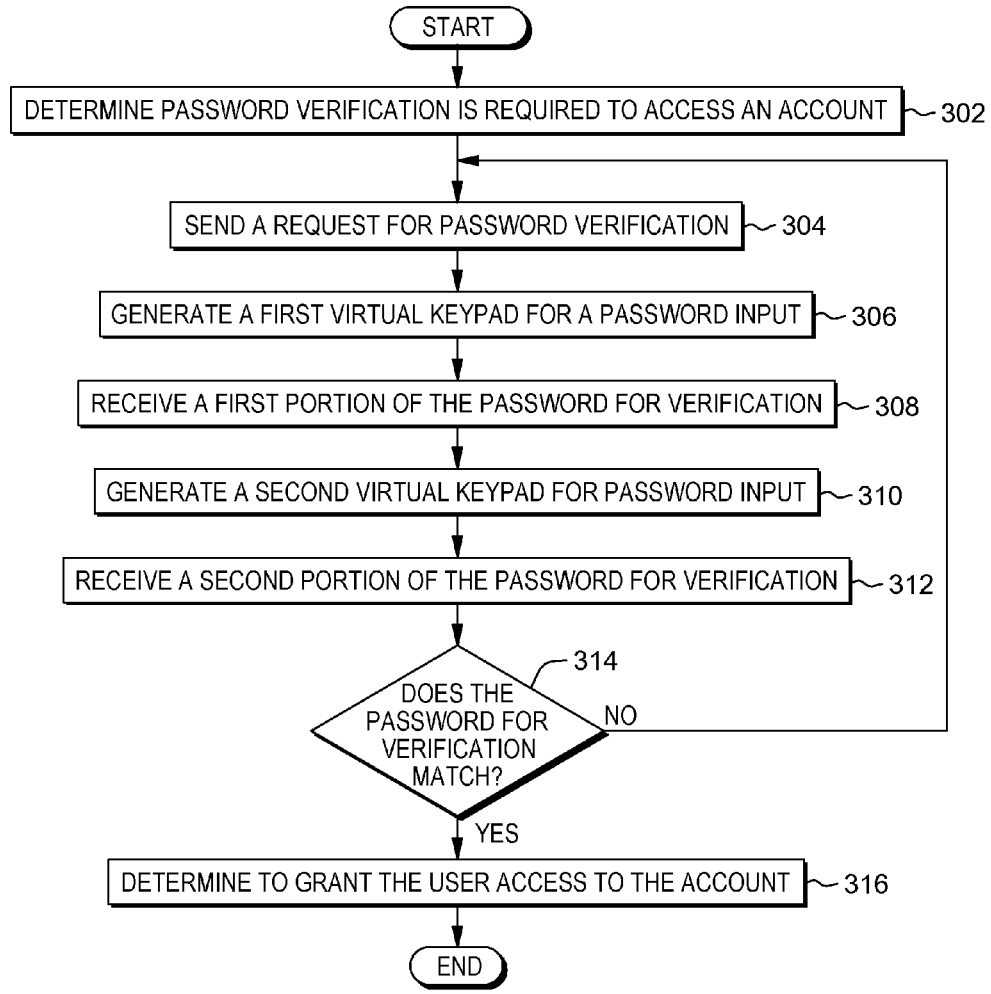
FIG. 3 is a flowchart depicting one embodiment of a security input program for receiving and verifying a password, in accordance with the present invention.

FIG. 3 is a flowchart depicting one embodiment of a security input program for receiving and verifying a password, in accordance with the present invention. As depicted, the method includes determining (302) password verification is required to access an account, sending (304) a request for password verification, generating (306) a first virtual keypad for password input, receiving (308) a first portion of the password for verification, generating (310) a second virtual keypad for password input, receiving (312) a second portion of the password for verification, determining (314) whether the password for verification matches the password for the account, and determining (316) to grant the user access to the account. In one embodiment, the method is conducted by security input program 108.

The method may commence by determining (302) password verification is required to access an account. In this embodiment, security input program 108 determines that a user is attempting to access a bank account through an online portal, where the user has entered a unique account name. Security input program 108 determines that a first portion of the bank account through the online portal which the user is attempting to access requires a password verification. Alternatively, security input program 108 can also determine that a second portion of the bank account through the online portal which the user is attempting to access does not require a password verification. In another embodiment, security input program 108 determines that a user is attempting to access an account at an automated teller machine (ATM), where the user has provided a card number via an ATM card. Security input program 108 can pull account information associated with the card number found on the ATM card and determine that a password verification for required to access the account.

The method may continue by sending (304) a request for password verification. In this embodiment, security input method 108 sends a request for password verification to a client device associated with the user attempting to access the bank account through the online portal. Security input program 108 can send the request in the form of a notification which displays in a user interface of the client device associated with the user. In another embodiment, security input program 108 sends a request for password verification to the ATM where the user has provided a card number via an ATM card. Security input program 108 can send the request in the form of a notification which displays in a first user interface on the ATM independent from a second user interface on the ATM utilized for displaying virtual keypads.

The method may continue by generating (306) a first virtual keypad for password input. Security input program 108 utilizes a standard Telecommunication Standardization Sector (ITU-T) E.161 keypad for generating the first virtual keypad, where the location of each key on the first virtual keypad is randomized. Security input program 108 randomizes each key on the first keypad such that the numbers are not duplicated and are in the 1 through 9 digit range. In one embodiment, security input program 108 does not randomize key locations for the pound key (#) and the asterisk key (*), where the pound key and the asterisk key remain in the standardized location on the first virtual keypad. In another embodiment, security input program 108 randomizes key locations for the pound key and the asterisk key along with the 1 through 9 keys of the first virtual keypad.

The method may continue by receiving (308) a first portion of the password for verification. In this embodiment, security input program 108 receives the first pair of digits (i.e., first portion) of a 4 digit password, where the first pair of digits are "74". The digit "7" represents the odd position value and the digit "4" represents the even position value. As a result, for the first pair, the user has to slide across "7" digits on the first virtual keypad, where one of the "7" digits includes the even position value "4". The entry of the "7" digits begins when a finger of the user makes contact with the first virtual keypad and ends when the contact between the finger of the user breaks contact with the first virtual keypad. As result, a sliding motion is used to select the "7" digits representing the odd portion value of the first pair of digits of the 4 digit password.

In this embodiment, sliding a finger over the pound key or the asterisk key represents a single digit and the user cannot slide over a key on the keypad more than once. For example, the user slides over "7" digits such as, "1345*82#", where the "7" digits include the odd position value "4". In another embodiment, the user can slide over a key on the keypad more than once, as long as another key separates the key being repeated. For example, a "7" digit entry of "1335*82#" is not an acceptable entry but a "7" digit entry of "1353*82#" is acceptable.

The method may continue by generating (310) a second virtual keypad for password input. Security input program 108 utilizes the same standard Telecommunication Standardization Sector (ITU-T) E.161 keypad for generating the second virtual keypad, where the location of each key on the second virtual keypad is randomized and the orientation of each key on the second virtual keypad is distinctly different from the orientation of each key on the first virtual keypad. Security input program 108 randomizes each key on the second keypad such that the numbers are not duplicated and are in the 1 through 9 digit range. In one embodiment, security input program 108 does not randomize key locations for the pound key (#) and the asterisk key (*), where the pound key and the asterisk key remain in the standardized location on the second virtual keypad. In another embodiment, security input program 108 randomizes key locations for the pound key and the asterisk key along with the 1 through 9 keys of the second virtual keypad.

The method may continue by receiving (312) a second portion of the password for verification. In this embodiment, security input program 108 receives the second pair of digits (i.e., second portion) of a 4 digit password, where the second pair of digits are "63". The digit "6" represents the odd position value and the digit "3" represents the even position value. As a result, for the second pair, the user has to slide across "6" digits on the second virtual keypad, where one of the "6" digits includes the even position value "3". The entry of the "6" digits begins when a finger of the user makes contact with the first virtual keypad and ends when the contact between the finger of the user breaks contact with the first virtual keypad. As result, a sliding motion is used to select the "6" digits representing the odd portion value of the second pair of digits of the 4 digit password. In this embodiment, sliding a finger over the pound key or the asterisk key represents a single digit and the user cannot slide over a key on the keypad more than once. For example, the user slides over "6" digits such as, "134*5#", where the "7" digits include the odd position value "3".

The method may continue by determining (314) whether the password for verification matches the password for the account. In the event that security input program 108 determines the password for verification matches the password for the account ("yes" branch, 314), security input program 108 determines (316) to grant the user access to the account. In the event that security input program 108 determines the password for verification does not match the password for the account ("no" branch, 314), security input program 108 resends a request for password verification. In the request, security input program 108 does not specify why the password for verification did not match the password for the account, whether it be due to an incorrect input method or an incorrect password entry. Security input program 108 can receive another password for verification or security input program 108 can receive a request (not illustrated in FIG. 3) to receive the correct password via an email address associated with the account the user is attempting to access.

The method may continue by determining (316) to grant the user access to the account. In this embodiment, security input program 108 grants the user access to the back account through the online portal. In another embodiment, security input program 108 grants the user access to the account at the automated teller machine (ATM).

Figure 4:
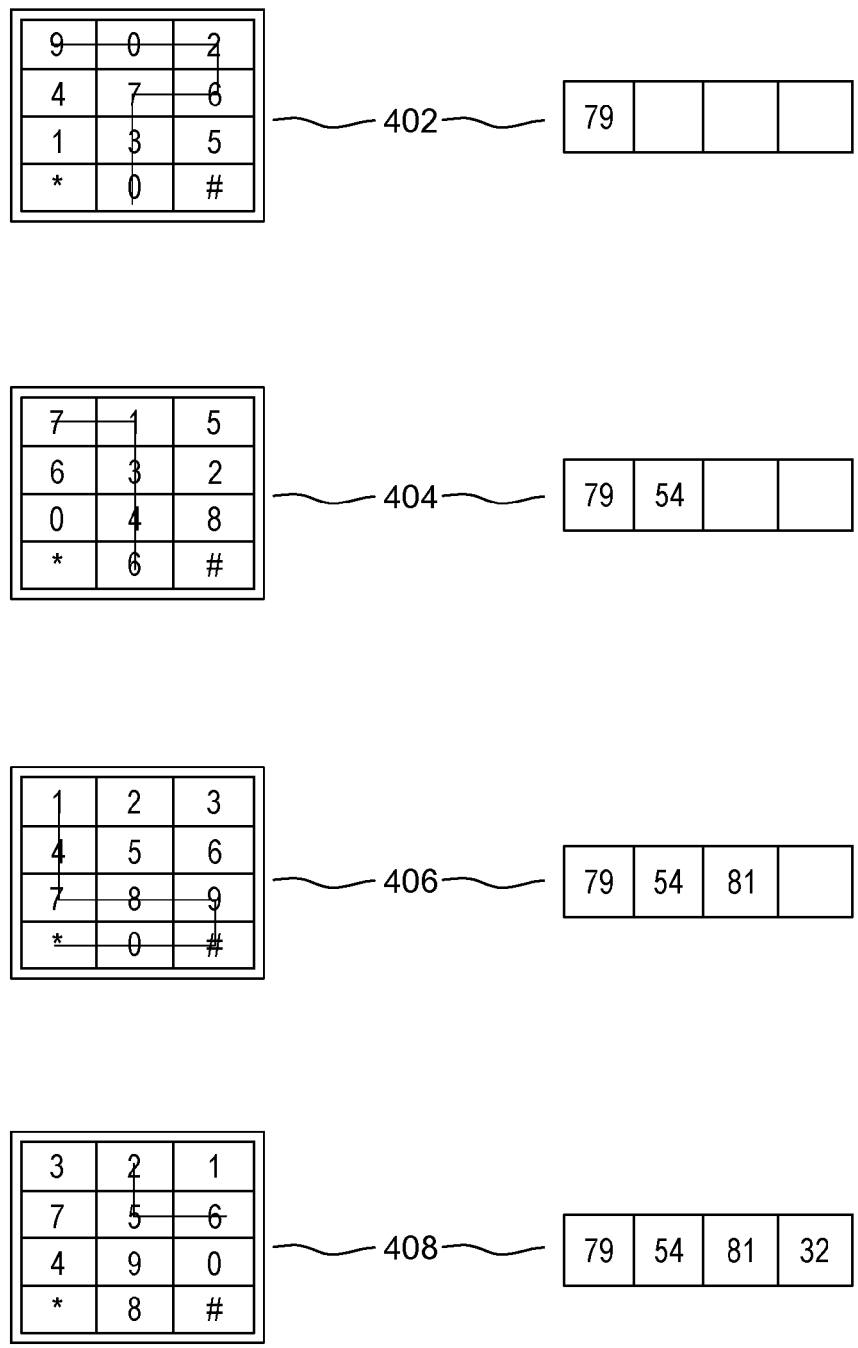
FIG. 4 illustrates an example scenario of a password entry utilizing multiple virtual keypads, in accordance with the present invention.

FIG. 4 illustrates an example scenario of a password entry utilizing multiple virtual keypads, in accordance with the present invention.

In this embodiment, a user is attempting to access an account, where the account has an eight digit password of "79548132". First portion password input 402 includes security input program 108 receiving a first pair (i.e., "79") of the eight digit password through a first virtual keypad, where security input program 108 randomizes the position of the keys in the first virtual keypad. The user slides over "7" digits to obtain the odd position value of the pair, where the "7" digits include the even position value of the pair, "9". Second portion password input 404 includes security input program 108 receiving a second pair (i.e., "54") of the eight digit password through a second virtual keypad, where security input program 108 randomizes the position of the keys in the second virtual keypad. The position of the keys in the second virtual keypad is distinctly different from the position of the keys in the first virtual keypad. The user slides over "5" digits to obtain the odd position value of the pair, where the "5" digits include the even position value of the pair, "4".

Third portion password input 406 includes security input program 108 receiving a third pair (i.e., "81") of the eight digit password through a third virtual keypad, where security input program 108 randomizes the position of the keys in the third virtual keypad. The position of the keys in the third virtual keypad is distinctly different from the position of the keys in the second virtual keypad. The user slides over "8" digits to obtain the odd position value of the pair, where the "8" digits include the even position value of the pair, "1". Fourth portion password input 408 includes security input program 108 receiving a fourth pair (i.e., "32") of the eight digit password through a fourth virtual keypad, where security input program 108 randomizes the position of the keys in the fourth virtual keypad. The position of the keys in the fourth virtual keypad is distinctly different from the position of the keys in the third virtual keypad. The user slides over "3" digits to obtain the odd position value of the pair, where the "3" digits include the even position value of the pair, "2". Security input program 108 combines the four pairs of the eight digit passwords and determines whether the password for verification matches the password for the account the user is attempting to access. Subsequent to determining the password for verification matches the password for the account, security input program 108 grants the user access to the account being accessed.

Figure 5:
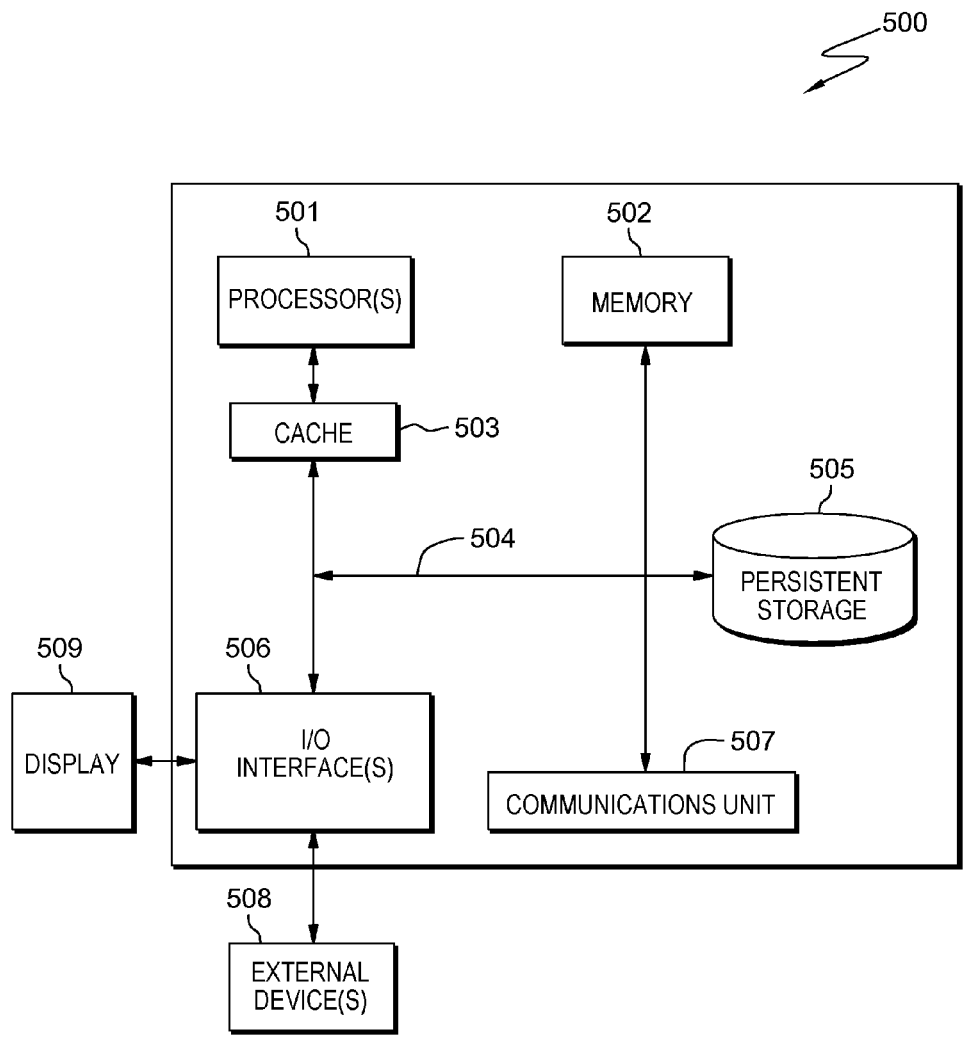
FIG. 5 is a block diagram of components of a computer system, such as the computer server of FIG. 1, in an embodiment in accordance with the present invention.

FIG. 5 depicts computer system 500, where server computer 102 is an example of a system that includes security input program 108. The computer system includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   receiving, by one or more processors, a request to create a password;
   sending, by one or more processors, guidelines for the password to a client device associated with a user, wherein the guidelines for the password include character type requirements of at least one numerical value, alphabetical letter, language logogram, and image;
   receiving, by one or more processors, a first portion and a second portion of the password; and
   responsive to the user correctly inputting the first portion and the second portion of the password during a test run, storing, by one or more processors, the first portion and the second portion of the password as an account password;
   determining, by one or more processors, the password is required for granting the user access to an account;
   sending, by one or more processors, a request to a client device associated with the user for the password;
   generating, by one or more processors, a first virtual keypad with a first randomization of an orientation of keys of the first virtual keypad for entry of the first portion of the password, wherein the first portion includes a first value and a second value;
   receiving, by one or more processors, the first portion of the password, wherein the first portion includes a first set of keys including a first number of keys entered by the user using the first virtual keypad, wherein the first number of keys included in the first set of keys is equal to the first value and the second value is present in the first set of keys;
   generating, by one or more processors, a second virtual keypad with a second randomization of an orientation of keys of the second virtual keypad different from the orientation of keys of the first virtual keypad for entry of the second portion of the password, wherein the second portion includes a third value and a fourth value;
   receiving, by one or more processors, the second portion of the password, wherein the second portion includes a second set of keys including a second number of keys entered by the user using the second virtual keypad, wherein the second number of keys included in the second set of keys is equal to the third value and the fourth value is present in the second set of keys; and
   responsive to determining the first portion and the second portion of the password match the account password, determining, by one or more processors, to grant the user access to the account associated with the account password.

* * * * *